3,288,768
METHOD FOR MANUFACTURING AMORPHOUS LINEAR COPOLYMERS
Mamoru Shiga and Yasuo Fujikake, Yokohama, Japan, assignors to Chisso Corporation, Osaka, Japan, a corporation of Japan
No Drawing. Filed Apr. 2, 1963, Ser. No. 269,896
Claims priority, application Japan, Apr. 19, 1962, 37/15,293; Mar. 1, 1963, 38/10,856
13 Claims. (Cl. 260—88.2)

This invention relates to a method for copolymerizing α-olefins in the presence of a novel catalyst system giving a specific effect in copolymerization.

There have been known a number of processes for the copolymerization of α-olefins, particularly of ethylene with other olefins. However, when two olefins are different in polymerization velocity, namely when one reacts more rapidly than the other, it is impossible to obtain homogeneous copolymer. Copolymer made by conventional methods are nothing but mixtures of copolymers having various composition and wide ranges of molecular weight distribution. Therefore, not all the resulting copolymers are suitable for specific applications. For example, in the copolymerization of ethylene with propylene, the former is polymerized far more rapidly than the latter. Consequently, in accordance with the prior arts, it was extremely difficult to prepare ethylene-propylene copolymers having a homogeneous composition and a narrow molecular weight distribution. Namely, the copolymers produced by conventional processes were such that they should be considered mixtures of a great number of copolymers in which the ratio of ethylene and propylene were varied in a wide range.

In copolymerization reaction, the composition of a copolymer formed at a given moment is represented by the following equation:

$$\frac{dm_1}{dm_2}=\frac{M_1}{M_2}\frac{r_1M_1+M_2}{M_1+r_2M_2}$$

wherein $M_1$ and $M_2$ are the molar fractions of first and second olefins present together with the catalyst in the reaction system, $dm_1$ and $dm_2$ are the molar fractions of first and second olefins in the copolymer formed at the given moment, and $r_1$ and $r_2$ are the monomer reactivity ratios of respective olefin monomers. For example, where the first olefin is ethylene and the second is another α-olefin, $r_1$ is far greater than $r_2$, in general. This implies that ethylene tends to be incorporated in copolymers more rapidly than other olefins. In other words, there are formed copolymers of a composition containing ethylene in a far larger amount than that in the original composition of starting material monomers present together with the catalyst.

Therefore, unless a procedure is adopted to maintain the ethylene concentration in the reactants constant during the copolymerization, the ethylene content gradually decreases to result in the gradual variation in the composition of the copolymer formed in each moment. Accordingly, the resulting final copolymer forms a mixture of copolymers having the compositions of each stage and becomes non-homogeneous material the composition thereof being distributed in a wide range.

In order to overcome said drawback, there has conventionally been adopted a process in which only a small proportion of a monomer mixture charged in the reaction system is used in copolymerization, a major proportion of monomers is discharged out of the system in the unreacted state, the composition of the monomers is controlled as it has been before the reaction and then the so controlled monomers are recycled as a part of a fresh feed gas. However, in order to practise said process, troublesome operations and complex apparatuses are required.

On the other hand, owing to the belief that any given catalyst system always provides the same monomer reactivity ratios, there has not heretofore been devised a method for obtaining different monomer reactivity ratios using the same catalyst system. It has not heretofore been realized that copolymers of various compositions are obtainable from the same starting mixture by merely changing the proportions of the catalyst components. An object of the present invention is to provide a method for producing copolymers having a substantially definite component ratio and a narrow molecular weight distribution.

Another object of the present invention is to provide a method for copolymerizing α-olefins at a high copolymerization velocity.

A further object of the present invention is to provide a method for preparing copolymers high in molecular weight.

The present invention provides a novel catalyst for achieving the above objects.

According to the present invention, the catalyst system is formed by mixing a first component of a vanadium compound, particularly vanadium tetrachloride ($VCl_4$) or vanadium oxy-trichloride, a second component of an alkylaluminum dihalide represented by the formula $RAlX_2$, wherein R is an alkyl group and X is halogen, and a third component of a dialkylaluminum alkoxide of the formula $R_2Al(OR)$, wherein R is an alkyl group. The vanadium compound is vanadium tetrachloride, vanadium oxy-trichloride, vanadium tetrabromide or vanadium oxy-tribromide. The alkylaluminum dihalide is, for example, ethylaluminum dichloride, propylaluminum dichloride, butylaluminum dichloride or a bromine or iodine compound corresponding thereto. The dialkylaluminum alkoxide is, for example, diethylaluminum ethoxide or dimethylaluminum methoxide. However, the catalyst components of the present invention are not limited to the above compounds.

The action of the third catalyst component is extremely marked and gives a great advantage in practising the method of this invention. Further, the third component shows a specific effect of increasing the polymerization degree of the resulting copolymerizate. However, said effect is not the mere increase in an average overall polymerization degree but is ascribable to the fact that the molecular weight distribution becomes narrower, since the third component prevents the formation of undesirable low molecular weight portions. This improves the physical properties of the final product made from said copolymer.

The molar ratio between respective catalyst components should be varied depending on the composition and the polymerization degree of the desired copolymer. As a whole, however, the second component $RAlX_2$ and the third component $R_2Al(OR)$ may preferably be employed in amounts 0.5–6 mols and 0.5–3 mols, respectively, per mol of the first component vanadium compound. It should be noted, however, that the catalyst composition of the present invention is not limited thereto. The features of the present catalyst system will be more fully illustrated referring to the case where an ethylene-propylene copolymer is produced. In the copolymerization of ethylene with propylene, where the amount of added alkylaluminum alkoxide is gradually varied within a range of 0 to 3 equivalents per equivalent of the vanadium compound and per 6 equivalents of alkylaluminum dichloride, the marked increase in copolymerization velocity is recognized with increasing amount of the alkoxide, as seen in Table 1 of Example 1. Also, the mol percent of propylene in the copolymer as well as the polymerization degree of the copolymer gradually increases as the amount of the added third component dialkylaluminum alkoxide increase. This effect of dialkylaluminum alkoxide is entirely the same even under conditions varying in the kind of vanadium compounds, the composition of feed monomers and the polymerization temperature. For example, as shown in Table 2 of Example 2, even when vanadium oxytrichloride is employed in place of the vanadium tetrachloride, the feed ratio of ethylene to propylene employed is 20 to 80, 30 to 70, or 50 to 50, and the polymerization temperature is varied from 40° C. to 30° C., there are recognized the increases in copolymerization velocity, mol percent of propylene in copolymers and polymerization degree of copolymers.

Although the present catalyst system is composed of same components, it gives an effect of forming copolymers having various compositions from a definite monomer mixture. This is the characteristic of the present catalyst system which was not hitherto seen in any conventional catalyst systems. This catalyst can be previously formed out of the polymerization reaction system and then can be fed to the reaction system. Alternatively, it can be prepared in the polymerization system by mixing the catalyst components in the same solvent as employed in the copolymerization reaction, before introducing the monomer mixture. The catalyst components may be mixed in optional order, but it is preferred that the first and second components be mixed before the third component is added thereto.

α-Olefins copolymerizable in accordance with the present invention are ethylene, propylene, butene-1, pentene-1 and other higher α-olefins. The inert organic solvents employed in the copolymerization of the present invention, in general, are aromatic, alicyclic, and aliphatic hydrocarbons which dissolve all of the catalyst, olefin monomers and the resulting copolymers and which can maintain the system uniform throughout the reaction period. Solvents suitable for said purpose are, for example, n-hexane, n-heptane, octane, benzene, toluene, xylene, and cyclohexane.

The present copolymerization reaction is practicable over wide ranges of temperature and pressure. However the temperature employed is within a range of −20° to 60° C., preferably 0° to 40° C. Also, the pressure adopted may be atmospheric but a further high pressure, e.g., within a range of 1 to 20 atm., is also applicable. In accordance with the present invention, it is possible as mentioned above to produce copolymers having desired composition and polymerization degree by suitably selecting the composition of catalyst to be employed. It is needless to say, however, that copolymers having suitable properties as plastomers and elastomers are also obtainable by controlling the polymerization conditions, such as temperature and pressure, as well as the compositions of feed monomers and the ratio of catalyst components.

That the copolymers obtained according to the polymerization process of the present invention are more homogeneous than conventional ones in composition as well as in distribution of polymerization degree, is obvious from the extraction tests of respective copolymers. Namely, as seen in Table 5 of Example 5, when respective copolymers obtained by use of catalyst systems with and without added third component dialkylaluminum alkoxide are extracted, respectively, with acetone, ether, n-hexane and n-heptane, it will be understood that the former is far more homogeneous than the latter in composition and in distribution of polymerization degree. The copolymers thus obtained have a homogeneous composition and a narrow distribution of polymerization degree and shows desirable physical properties for various applications. Such effects are connected with the monomer reactivity ratios inherent to the catalyst systems obtained regardless of such polymerization conditions as pressures and temperatures, and are the features of the catalyst systems employed in the present invention.

The copolymerization process of the present invention will be illustrated with the following examples:

Example 1

An interior of glass reactor provided with a reflux-condenser (serving also as a discharge pipe for unreacted monomers), a pipe for introducing a monomer mixture gas, a thermometer and a stirrer was flushed with nitrogen. To the reactor, 550 ml. of n-heptane was introduced under nitrogen atmosphere and then 2 ml. respectively of n-heptane solutions of 0.5 m. mol of vanadium tetrachloride ($VCl_4$), 3.0 m. mols of ethylaluminum dichloride ($AlEtCl_2$) and a given amount (the amount was varied as 0, 0.25, 0.5 and 1.5 m. mol) of diethylaluminum ethoxide ($AlEt_2(OEt)$) were added in the order of $VCl_4$, $AlEt_2(OEt)$ and $AlEtCl_2$, while stirring and flushing the interior of the reactor with nitrogen, whereby a red purple catalyst was immediately formed. The liquid remained transparent and homogeneous, and formed no precipitate at all.

Immediately thereafter, a mixture gas comprising 30 mol percent of ethylene and 70 mol percent of propylene was blown, through the orifice and a gas-meter, into the liquid at a rate of 4 l./min., and the copolymerization was initiated. The inner temperature immediately increased to show the initiation of polymerization. The liquid gradually became viscous but no insoluble polymerizate nor precipitate was formed.

30 minutes later the charge of monomers was discontinued and the content of the reactor was sufficiently stirred with the addition of 10 ml. of methanol and 20 ml. of hydrochloric acid diluted with water (the ratio of hydrochloric acid to water being 1:4); thus to effect termination of reaction and decomposition of catalyst.

Subsequently, the content was taken out of the reactor and the lower layer was separated. To the heptane layer, a solution prepared by mixing methanol with acetone at a ratio of 2:1 was gradually added in about 3 times the amount thereof, while thoroughly stirring the solution, whereby the copolymer is separated. The rubbery copolymer thus obtained was further treated in a mixer together with a large amount of methanol, separated after sufficient pulverization and washing and dried in vacuo at 40° C. for 48 hours. The resulting copolymer was colorless and transparent and resembled unvulcanized rubber. Infra-red absorption spectrum confirmed that the copolymer contained no crystalline portion.

The results obtained are shown in Table 1.

TABLE 1

| Catalyst component (molar ratio) | | | Copolymer (g.) | Polymerization velocity | Copolymer composition, Propylene (mol percent) | $[\eta]$ |
| --- | --- | --- | --- | --- | --- | --- |
| $VCl_4$ | $AlEtCl_2$ | $AlEt_2(OEt)$ | | | | |
| 1 | 6 | 0 | 8.70 | 34.8 | 36.9 | 1.68 |
| 1 | 6 | 0.5 | 14.22 | 56.9 | 37.1 | 1.80 |
| 1 | 6 | 1.0 | 13.94 | 55.8 | 39.9 | 2.36 |
| 1 | 6 | 3.0 | 11.70 | 46.8 | 43.4 | 3.48 |

Note: (i) Catalyst components are shown by the molar ratios to one equivalent of $VCl_4$.
(ii) Polymerization velocity is g. copolymer/m. mol $VCl_4$ x hr.
(iii) $[\eta]$ shows an intrinsic viscosity in tetraline at 135° C.

Example 2

Experiments on the copolymerization of ethylene with propylene were conducted in the same manner as in Example 1 except that the kinds of vanadium compound, the polymerization temperature and the compositions of feed monomers were varied.

The polymerization conditions and the results are shown in Table 2.

TABLE 2

| Vanadium compound | Catalyst composition | | | Temp.,° C. | Ethylene/ propylene feed ratio | Time (min.) | Polymerization velocity | Copolymer | |
|---|---|---|---|---|---|---|---|---|---|
| | V | AlEtCl$_2$ | AlEt$_2$(OEt) | | | | | Propylene (mol percent) | [$\eta$] |
| VCl$_4$ | 1 | 0 | 3 | 40 | 35/65 | 20 | 26.7 | 54.6 | 2.76 |
| VCl$_4$ | 1 | 3 | 0 | 30 | 30/70 | 30 | 21.9 | 39.3 | 2.44 |
| VCl$_4$ | 1 | 3 | 0.5 | 30 | 30/70 | 30 | 56.0 | 42.7 | 2.62 |
| VCl$_4$ | 1 | 3 | 1 | 30 | 30/70 | 30 | 48.7 | 43.6 | 3.13 |
| VCl$_4$ | 1 | 3 | 3 | 30 | 30/70 | 30 | 45.6 | 61.1 | 3.67 |
| VCl$_4$ | 1 | 3 | 0 | 30 | 50/50 | 20 | 27.0 | 23.6 | 1.41 |
| VCl$_4$ | 1 | 3 | 1 | 30 | 50/50 | 10 | 165.6 | 25.0 | 4.58 |
| VOCl$_3$ | 1 | 3 | 0 | 30 | 30/70 | 20 | 36.0 | 34.6 | 2.20 |
| VOCl$_3$ | 1 | 3 | 0.5 | 30 | 30/70 | 20 | 58.0 | 36.9 | 2.32 |
| VOCl$_3$ | 1 | 3 | 1 | 30 | 30/70 | 20 | 64.4 | 37.3 | 2.38 |
| VOCl$_3$ | 1 | 3 | 3 | 30 | 30/70 | 20 | 63.9 | 41.4 | 2.58 |
| VOCl$_3$ | 1 | 3 | 0.5 | 40 | 20/80 | 60 | 8.5 | 42.3 | 1.64 |
| VOCl$_3$ | 1 | 3 | 1 | 40 | 20/80 | 60 | 9.6 | 44.4 | 2.04 |
| VOCl$_3$ | 1 | 3 | 3 | 40 | 20/80 | 60 | 14.4 | 50.0 | 2.44 |

Example 3

Ethylene-propylene copolymerization was carried out by using AlEt$_2$(OEt) in amounts of 0.25, 0.5 and 1.5 mmols on the basis of 0.5 mmol of VCl$_4$ and 0.25 mmol of AlEtCl$_2$. The molar ratio of ethylene to propylene was 35:65. The operations adopted were the same as in Example 1. The polymerization conditions and the results are shown in Table 3.

TABLE 3

| Catalyst composition | | | Time (min.) | Polymerization velocity | Copolymer | |
|---|---|---|---|---|---|---|
| VCl$_4$ | AlEtCl$_2$ | AlEt$_2$(OEt) | | | Propylene, percent | [$\eta$] |
| 1 | 0.5 | 0.5 | 30 | 11.6 | 31.4 | 2.26 |
| 1 | 0.5 | 1.0 | 30 | 12.7 | 46.5 | 3.22 |
| 1 | 0.5 | 3.0 | 20 | 23.1 | 52.2 | 3.17 |

Example 4

In the same manner as in Example 1, a mixture gas of 30 ethylene and 70 propylene was copolymerized. The polymerization temperature was 40° C. Sample A was prepared by use of a catalyst comprising 0.5 mmol of VCl$_4$ and 1.5 mmols of AlEtCl$_2$, while sample B a catalyst comprising 0.5 mmol of VCl$_4$, 1.5 mmols of AlEtCl$_2$ and 0.5 mmol of AlEt$_2$(OEt). Mol percent of propylene and the [$\eta$] of said samples are shown in Table 4.

TABLE 4

| Sample | VCl$_4$ | AlEtCl$_2$ | AlEt$_2$(OEt) | Polymerization velocity | Propylene, percent | [$\eta$] |
|---|---|---|---|---|---|---|
| A | 1 | 3 | 0 | 26.9 | 34.3 | 2.25 |
| B | 1 | 3 | 1 | 34.3 | 35.3 | 2.40 |

Each 3 g. of the above samples were successively extracted under reflux by means of 300 ml. of acetone, ether, n-hexane and n-heptane, respectively. The extraction period for each solvent was 30 to 80 hours. After the extraction, each extract was concentrated, completely dried and weighed and the mol percent of propylene was measured by infrared absorption spectrum. The results are shown in Table 5.

TABLE 5

| Sample | Copolymer | Acetone extract | | Ether extract | | Hexane extract | | Heptane extract | | Residue |
|---|---|---|---|---|---|---|---|---|---|---|
| | C$_3$ (propylene) percent | wt. percent | C$_3$ percent | wt. percent | C$_3$ percent | wt. percent | C$_3$ percent | wt. percent | C$_3$ percent | |
| A | 34.3 | 15.5 | 43.2 | 44.5 | 29.0 | 38.0 | 27.7 | 2 | | 0 |
| B | 35.3 | 2.3 | 37.5 | 29.7 | 36.2 | 67.8 | 33.8 | 0.2 | | 0 |

The above table obviously shows that the copolymer obtained in accordance with the present invention is more homogeneous in composition distribution and narrower in polymerization degree distribution than the other.

Example 5

By use of the same reactor as in Example 1, ethylene was copolymerized with 1-butene, using n-hexane as a solvent. In 550 ml. of n-hexane, were charged 0.5 mmol of VCl$_4$, 0.5 mmol of AlET$_2$(OEt) and 3 mmols of AlEtCl$_2$. Into the catalyst solution, a mixture gas comprising 50 mol percent ethylene and 50 mol percent of 1-butene was immediately blown at a rate of 4 l./min., while maintaining the inner temperature of the reactor at 30° C. 30 minutes later, the blowing of the gas was discontinued. The resulting reaction mixture was sufficiently homogeneous. The copolymerizate was purified in the same manner as mentioned before. The yield of ethylene-1-butene copolymer was 12.0 g. The mol percent of 1-butene was 45 and [η] was 22.

Example 6

Into the same reactor as in Example 1, respective solutions of (A) 0.5 mmol of $VCl_4$, (B) 3.0 mmols of $AlEtCl_2$ and (C) 1.5 mmols of AlEt(OEt) in 2 ml. of n-heptane were charged in the order shown in the following table, i.e., (A)→(B)→(C) and (B)→(A)→(C). The copolymerization and operations were carried out in the same manner as in Example 1. The yield, composition and intrinsic viscosity of each copolymer obtained and the polymerization velocity were as shown in the following table, in which the results of the same experiments conducted by use of catalysts prepared by varying the addition order of (A), (B) and (C) are also shown, for comparison.

to those obtained in Examples 6 and 7, respectively, using the charging orders (A)–(B)–(C) and (B)–(A)–(C).

What we claim is:

1. A method for producing amorphous linear copolymers by copolymerizing ethylene with α-olefins having from three to five carbon atoms by use of a homogeneous catalyst dissolved in an inert organic solvent, comprising effecting the copolymerization in the presence of a catalyst comprising a first component of a vanadium compound selected from the group consisting of vanadium tetrachloride, vanadium oxy-trichloride, vanadium tetrabromide and vanadium oxy-tribromide, a second component of an alkylaluminum dihalide having the general formula $RAlX_2$, wherein R is an alkyl group and X is halogen, and a third component of an alkylaluminum alkoxide of the general formula $R_2Al(OR)$ wherein R is an alkyl group and OR is an alkoxy group.

2. A method according to claim 1 wherein the vanadium compound is $VCl_4$.

TABLE 6

| | Addition order of catalyst components | Copolymers produced | | | Polymerization velocity (g. copolymer/ mmol. $VCl_4$ x polymerization time (hr.)) |
|---|---|---|---|---|---|
| | | Yield (g.) | Composition propylene (mol. percent) | [η] | |
| Present process | (A)→(B)→(C) | 13.33 | 51.7 | 2.94 | 80.0 |
| | (B)→(A)→(C) | 12.98 | 50.9 | 3.16 | 77.8 |
| Referential examples | (A)→(C)→(B) | 10.08 | 44.7 | 3.12 | 60.5 |
| | (C)→(A)→(B) | 8.73 | 44.1 | 3.30 | 52.4 |
| | (C)→(B)→(A) | 10.70 | 42.5 | 2.85 | 64.2 |
| | (B)→(C)→(A) | 11.59 | 43.4 | 3.14 | 69.5 |

NOTE: [η] shows intrinsic viscosity in tetraline at 135° C.

Example 7

In the same manner as in Example 1, experiments of ethylene-propylene copolymerization were carried out by use of a mixture gas of ethylene and propylene having the same composition as in Example 1 in the presence of a catalyst system comprising (A) 0.5 mmols of $VOCl_3$, (B) 1.5 mmols of $AlEtCl_2$ and (C) 3.0 mmols of $AlEt_2(OEt)$ The results are shown in the following table in which the results of experiments on the same copolymerization by use of catalysts formed by varying the addition order of the catalyst components (A), (B) and (C) are also shown, for reference.

3. A method according to claim 1 wherein the vanadium compound is $VOCl_3$.

4. A method according to claim 1 wherein the alkylaluminum dihalide of the formula $RAlX_2$ is employed in an amount of 0.5–6 mols per mol of the vanadium compound.

5. A method according to claim 1 wherein the alkylaluminum alkoxide of the formula $R_2Al(OR)$ is employed in an amount of 0.5–3 mols per mol of the vanadium compound.

6. A method according to claim 1 wherein the alkylaluminum dihalide is ethylaluminum dichloride.

7. A method according to claim 1 wherein the dialkylaluminum alkoxide is diethylaluminum ethoxide.

8. A method according to claim 1 wherein the α-olefin is propylene.

TABLE 7

| | Addition order of catalyst components | Copolymers produced | | | Polymerization velocity (g. copolymer/ mmol. $VCl_3$ x polymerization time (hr.)) |
|---|---|---|---|---|---|
| | | Yield (g.) | Composition propylene (mol. percent) | [η] | |
| Present method | (A)→(B)→(C) | 13.89 | 45.0 | 2.38 | 83.3 |
| | (B)→(A)→(C) | 13.60 | 44.7 | 2.31 | 82.8 |
| Referential example | (C)→(B)→(A) | 12.00 | 41.0 | 2.54 | 76.5 |
| | (B)→(C)→(A) | 12.31 | 41.3 | 2.57 | 75.7 |
| | (A)→(C)→(B) | 12.58 | 40.7 | 2.42 | 72.5 |
| | (C)→(A)→(B) | 11.78 | 50.8 | 2.46 | 70.7 |

NOTE: [η] shows an intrinsic viscosity in tetraline at 135° C.

The same experiments as in Examples 6 and 7 were conducted by use of the catalyst formed by first adding (A) and (B) at the same time and then adding (C) to the resulting mixture. The results obtained were similar 9. A method according to claim 1 wherein the copolymerization is carried out at a temperature of from −20° C. to 60° C.

10. A method according to claim 1 wherein the copolymerization is carried out under a pressure of from 1 to 20 atm.

11. A method according to claim 1 wherein the order of the addition of catalyst components is selected so that the dialkylaluminum alkoxide is added last.

12. A method according to claim 1, wherein the alpha-olefin is butene-1.

13. A method for producing amorphous linear copolymers of ethylene with alpha-olefins having from three to five carbon atoms containing pre-determined high proportions of alpha-olefin in the final copolymer, comprising effecting the copolymerization in the presence of a catalyst comprising a first component of a vanadium compound selected from the group consisting of vanadium tetrachloride, vanadium oxy-trichloride, vanadium tetrabromide, and vanadium oxy-tribromide, a second component of an alkyl aluminum dihalide having the general formula $RAlX_2$, wherein R is alkyl and X is halogen, and a third component of an alkylaluminum alkoxide of the general formula $R_2Al(OR)$ wherein R is alkyl and OR is an alkoxy group, and regulating the amount of said third component in accordance with the proportion of alpha-olefin sought in the final copolymer.

References Cited by the Examiner
UNITED STATES PATENTS 2,956,993  10/1960  Nowlin et al. _____ 260—94.9

FOREIGN PATENTS 881,212  11/1961  Great Britain.

OTHER REFERENCES

Junghanns et al., Makromol. Chem. 58, 18 (1962) (pages 18–21 relied on).

JOSEPH L. SCHOFER, *Primary Examiner.*

M. B. KURTZMAN, *Assistant Examiner.*